3,231,559
ACTIVATION OF BISULFITE ADDUCTS OF DIALDEHYDE POLYSACCHARIDES
Donald H. Wheeler, Minneapolis, and James L. Keen, New Brighton, Minn., assignors to General Mills Inc., a corporation of Delaware
No Drawing. Filed Jan. 7, 1963, Ser. No. 249,584
7 Claims. (Cl. 260—209)

This invention relates to the utilization of aldehyde polysaccharide bisulfite adducts, and more particularly to the regeneration in aqueous systems of the aldehydic functionality of the aldehyde polysaccharide through activation of the bisulfite-aldehyde complex.

It is well known that in their dry form, polymeric aldehyde polysaccharides, such as dialdehyde cellulose, dialdehyde guar or locust bean gum, and dialdehyde starch or other aldehyde carbohydrates are, for all practical purposes, water insoluble. Procedures to put them into water solution involves subjecting them to vigorous treatment such as long solution times, boiling, or heating in water in the presence of borax or sodium bisulfite. Such procedures can seriously damage the aldehyde polymer.

Conventionally, it has been the practice to utilize aldehyde polysaccharides as their bisulfite adducts. Typically one mole of sodium bisulfite is added per mole of aldehyde group. In general this renders the aldehyde polysaccharide essentially water soluble, normally allowing solution, with stirring, in cold water. From a commercial standpoint, these bisulfite adducts of aldehyde polysaccharides are the most useful manufactured form.

In the utilization of the bisulfite adducts of aldehyde polysaccharides, one very important factor has been overlooked. It is true that the bisulfite adduct per se is usually readily water soluble and thus can be put in a form for its ultimate utilization, such as a wet end wet strength paper additive, as a binder for homogenized tobacco leaf, as a solution from which to cast water soluble films, and as a chemical intermediate. However, when the aldehydic functionality of the polysaccharide is present as a relatively stable bisulfite complex, this has a deleterious effect on the performance properties of the aldehyde polysaccharide. Comparing the wet end wet strength developed in a paper product through the use of a conventional bisulfite adduct of aldehyde polysaccharides with the wet end wet strength developed in the same paper product using aldehyde polysaccharides wherein the bisulfite adduct has been activated employing the method of the present invention, we have discovered very marked differences. Wet burst strengths using conventional bisulfite adducts of aldehyde polysaccharides are always much less than wet burst strengths developed through the use of aldehyde polysaccharides wherein the bisulfite adduct has been activated using the method of the present invention.

This discovery makes possible the development of significantly higher wet strengths than were possible previously with aldehyde polysaccharides or the development of satisfactory wet strength with significantly lower levels of aldehyde polysaccharide. Thus, the results of our invention provide a distinct advantage. Articles requiring a high degree of wet strength are now possible which heretofore could not be prepared using aldehyde polysaccharides with their concurrent advantages of non-permanency, repulpability, and biodegradability. And of course, an economic advantage results.

It is an object therefore of the present invention to provide a method for utilizing bisulfite adducts of aldehyde polysaccharides which enable the user to enjoy the advantages of the water solubility of the bisulfite adduct together with the significantly improved performance properties resulting from the in situ destruction of that adduct.

It is a further object of the present invention to provide an aldehyde polysaccharide composition which can be utilized to obtain significantly improved performance characteristics.

Still further objects and advantages will appear in the more detailed description set forth below, it being understood, however, that this more detailed description is given by way of illustration and explanation only, and not by way of limitation, since various changes may be made therein by those skilled in the art without departing from the scope and spirit of the present invention.

The aldehyde carbohydrates, particularly aldehyde polysaccharides, are compounds of record. U.S. Pat. 2,988,455 (Rosenberg, S. and Bandel, B.) discusses various dialdehyde or oxy type polysaccharide materials prepared by the oxidation of polysaccharides with periodic acid, for example, according to well-known reactions. Specific polysaccharides which form useful oxy derivatives of dialdehyde forms with periodic acid are cellulose, starch, dextran, and galactomannans such as locust bean gum. In many applications the more completely oxidized materials are preferred, although almost any degree of oxidation is useful. U.S. Patents 2,606,188 and 2,886,401 disclose dialdehyde starches with oxidation levels varying between 10 and 98% specifically.

Bisulfite adducts of dialdehyde starch are known (e.g., U.S. Patent 2,880,236 to Mehltretter et al.). The products disclosed there are dry form, white solids stable on storage at room temperature. These products are prepared from periodate oxidized starch, by contacting the dialdehyde starch with an aqueous solution of an inorganic compound yielding bisulfite ions. These dialdehyde starch-bisulfite adducts are typical of the dialdehyde carbohydrate or polysaccharide adducts of the present invention. The bisulfite adducts of aldehyde carbohydrates or polysaccharides of the present invention are used as sizing agents, adhesives, and thickeners, as well as wet end wet strength additives, and the like. In these and the other uses of this type materials, generally satisfactory results have been obtained. However, we have discovered that adding one additional simple step in the utilization of these dialdehyde polysaccharide-bisulfite adducts results in markedly improved performance characteristics. This step comprises treating the aqueous sol of the dialdehyde polysaccharide-bisulfite adduct with a simple organic aldehyde to effect an activation of the polymeric aldehyde groups. The organic aldehyde can be added as an aqueous solution, for example, formalin; it may be added as a solid material, for example, paraformaldehyde, or as a solution in an appropriate solvent. Preferably the organic aldehyde is added after the dialdehyde polysaccharide-bisulfite adduct is completely dispersed or dissolved. However, it may also be added during said dispersion and dissolution, or may be present as a particulate solid material uniformly blended with the solid dialdehyde polysaccharide-bisulfite adduct, or absorbed on the adduct and dried from an appropriate solution.

A preferred class of aldehyde polysaccharides is the dialdehyde galactomannan gums (such as guar or locust bean gum). These modified gums are prepared in a number of ways, preferably by intimately mixing 1 part of gum with about 1–3 parts slightly acidic water containing from about 0.05 to 0.25 mole of periodic acid or its salts per mole of hexose unit. After the reaction is complete, the product is freed of excess $IO_3^-$ by washing. This modified gum is then converted to the bisulfite adduct by the reaction of approximately one mole of an alkali metal bisulfite with the aldehyde gum. The modified gum, at a moisture level of about 40% to 75%, is mixed with the alkali metal bisulfite and allowed to stand for a sufficient time to complete the reaction (generally of the order of 8 to 24 hours) and then dried to a level of about 10% moisture to provide a dry adduct readily water soluble.

The organic aldehydes of the present invention may be characterized broadly. The critical requirement is that of aldehyde functionality incorporated in a molecule sufficiently soluble or dispersible in the final medium wherein the bisulfite adduct is to be employed. Generally, relatively low molecular weight water soluble simple organic aldehydes are preferred, such as formaldehyde, glyoxal, acetaldehyde, and propionaldehyde. These are preferred mainly from a standpoint of solubility, availability, and economics. Other more complex aldehydes, such as salicylaldehyde, benzaldehyde, or other aromatic aldehydes, the longer chain aldehydes, such as valeraldehyde, caproaldehyde, and stearaldehyde, and unsaturated aldehydes, such as acrolein, crotonaldehyde, and heterocyclic aldehydes such as furfural, may be used.

The exact mechanism of the activation of the aldehyde polysaccharide-bisulfite adduct with a simple organic aldehyde is not clearly defined. It may be simply one of preferential displacement whereby the mobile soluble simple organic aldehyde preferentially reacts with the bisulfite, thereby releasing the polymeric aldehyde. The rate of reaction of the simple organic aldehyde with the bisulfite adduct is pH dependent, proceeding relatively slowly at low pH's, for example pH 3, and quite rapidly at essentially neutral pH's.

In evaluating the effectiveness of the activation of the aldehyde polysaccharide-bisulfite adduct employing simple organic aldehydes, we have found the development of wet end wet strength to be particularly useful. Wet end wet strength additives can be evaluated by well-known laboratory procedures wherein hand sheets are fabricated to contain the desired level of additive under standardized procedures. The hand sheets are then equilibrated under desired conditions and the wet burst strength determined. Comparison is generally with a control.

The preferred embodiment of the present invention consists of the dissolution of the appropriate concentration of the aldehyde polysaccharide-bisulfite adduct, for example partially oxidized (periodate oxidation) guar gum, maintained at an essentially neutral pH, and treating said neutral dissolved adduct with aqueous formaldehyde. The resulting partially oxidized guar gum sol has been shown to be particularly effective in developing wet end wet strength when added to paper pulp and paper products prepared therefrom.

Generally the processes and compositions of the present invention cover a wide range of concentration of both aldehyde polysaccharide and simple organic aldehyde. Depending upon the particular end use, the aldehyde polysaccharide may be present at concentrations as low as 0.1% or even lower and as high as 30% or possibly higher for specialized uses. Generally, the level of addition of the simple organic aldehyde is of the range of 0.00001 gram to 0.1 gram of organic aldehyde per gram of dry solids aldehyde polysaccharide-bisulfite adduct. Obviously, only a moderate effect will be observed at the lower levels with proportionately greater effects at the higher concentrations. The optimum concentration for any given system depends on a great number of factors such as concentration of the bisulfite adduct, pH, time, temperature, the particular organic aldehyde being used, and the end use contemplated. Generally however we have found that, in the case of wet end wet strength additives, 1% solutions of the aldehyde polysaccharide-bisulfite adduct treated with from about 0.02 to about 0.2 gram of low molecular weight organic aldehyde per gram of dry solids bisulfite adduct are preferred and give highly satisfactory wet burst strength when added to a conventional paper pulp, and handsheets prepared therefrom.

The following are specific examples of the operation of the present invention. In Examples I through V, development of wet end wet strength has been used as the measure of the effectiveness of the methods and compositions of the present invention. The following procedures were employed in these examples.

*Pulp and handsheet preparation.*—Bleached kraft pulp, 360 g. dry wt. of, is mixed and dispersed in 24 liters of 25° C. tap water for 2 hours with an air motor mixer. The pulp is transferred to a Valley Laboratory beater and beaten 35 minutes to a Schopper-Riegler freeness near 700. The refined pulp is collected in a large container and diluted and mixed with 24 liters of water to about 0.8% consistency. Up to 15 three liter pulp samples can be obtained. As used, each pulp sample is adjusted and held at pH 4.5 with HCl, and mixed about 15 minutes with 12, 24, or 60 cc. of 1% additive solution, or equivalent, corresponding to 0.5, 1.0 and 2.5% additive level in pulp, based on pulp solids. The 3 liter mixed sample is divided into 3 equal portions and a handsheet is formed from each portion at about 0.025% consistency at pH 4.5 on a Noble and Wood Handsheet Machine. Handsheets are pressed using the Noble and Wood machine. Handsheets are dried 3.5 minutes at about 195° F. while still attached to the wire on a cylindrical dryer. Handsheets are conditioned overnight or longer in a TAPPI room at 50% relative humidity and 73° F.

*Handsheet testing.* — Conditioned handsheets are weighed and halved. Ten acceptable dry burst values are taken from a half portion of each sheet. The other half of each sheet is soaked about 15 minutes (15 minutes for the middle sheet) in distilled water, and burst measured on a Perkins Mullen Tester equipped with an air operated clamp without blotting excess water from the sheet. Burst is reported in terms of # per 100# ream weight (500 x 25' x 40') at various levels tested. Dry burst of control handsheets was generally about 150#/100# of ream weight, while wet burst of control handsheets was too weak to be measured.

Dialdehyde guar gum bisulfite adducts (excess bisulfite) of a periodate oxidized guar gum in which approximately 10% of the hexose units have been converted to dialdehyde units are conveniently prepared as follows:

160 g. (dry weight) of commercial guar gum was placed in a small Readco laboratory mixer and 300 cc. of slightly acid solution containing about 0.05 mole of periodate was added over an hour period. About 488 g. of product was obtained. This was dried to 215 g. in a small gas heated laboratory rotary drier. The dried product was suspended in about 850 cc. of water and collected in a basket centrifuge. The product was washed in the centrifuge with about 300 cc. of water. 830 cc. of washings containing 80% of the resulting $IO_3^-$ were obtained; 430 g. of moist product were obtained. The moist product was well mixed with 18 g. of $NaHSO_3$ in a laboratory mixer. It was then dried in the small gas heated laboratory rotary drier. 200 g. of product containing 14% moisture was obtained.

Example I

A 10% dialdehyde guar bisulfite adduct was prepared essentially as described above and from it a 1% sol was made. After complete solution, which required about 2 hours, samples of this sol were treated with various levels of formaldehyde, as a 37% aqueous solution, and allowed to stand. The pH of the untreated bisulfite adduct was pH 5. The addition of formaldehyde did not change the pH. Results were as follows:

| Level of HCHO added ml. 37% HCHO per 500 ml. 1% sol | Wet Burst Strength, lbs./100 lbs. ream weight (500 x 25' x 40') at a 2.5% level of addition (pH 5) |
|---|---|
| 0 (control) | 24 |
| 0.25 | 25 |
| 0.50 | 44 |
| 0.75 | 56 |
| 1.0 | 58 |
| 2.0 | 57 |

Example II

A series of organic aldehydes were tested by addition to the dialdehyde guar gum bisulfite adduct of Example I as per the general method in Example I, but with the exception that the 1% sols were treated at pH 3.4 and allowed to stand for the times indicated below:

| Run | Level of aldehyde added per 500 ml. 1% sol | | | | Wet Burst, 2.5% level, lbs./100 lbs. ream wt. |
|---|---|---|---|---|---|
| | Aldehyde | Ml. | Conc., percent | Age of Created Sol | |
| IIa (control) | | 0 | | | 24–27 |
| IIb | Formaldehyde | 1.0 | 37 | 2 hours | 27 |
| IIc | do | 1.0 | 37 | 4 days | 55 |
| IId | Glyoxal | 4.0 | 25 | 2 hours | 28 |
| IIe | do | 4.0 | 25 | 4 days | 50 |
| IIf | Acetaldehyde | 0.5 | 100 | 2 hours | 28 |
| IIg | do | 0.5 | 100 | 4 days | 52 |
| IIh | Propionaldehyde | 0.66 | 100 | 2 hours | 28 |
| IIi | do | 0.66 | 100 | 4 days | 42 |

Example III

Activation of the bisulfite adduct is a function of time, temperature, and pH. Using the dialdehyde guar bisulfite adduct of Example I and the general procedure of Example I, the effect of time and temperature on the activation by formaldehyde was as follows:

| Run | Conditions of Treatment | | | | Wet Burst, 2.5% level, lbs./100 lbs. ream weight |
|---|---|---|---|---|---|
| | Level, ml.[1] | pH[2] | Time[3] | Temp.[3] | |
| IIIa | | 5 | | Room | 24 |
| IIIb | | 5 | | 55° C | 26 |
| IIIc | 1 | 5 | 1 min | Room | 26 |
| IIId | 1 | 5 | 1 min | 55° C | 34 |
| IIIe | 1 | 5 | 1 min | 75° C | 55 |
| IIIf | 1 | 5 | 5 min | 55° C | 55 |
| IIIg | 1 | 5 | 15 min | Room | 28 |
| IIIh | 1 | 5 | 15 min | 55° C | 58 |
| IIIi | 1 | 5 | 30 min | Room | 30 |
| IIIj | 1 | 5 | 60 min | Room | 35 |
| IIIk | 1 | 5 | 120 min | Room | 56 |
| IIIl | 1 | 5 | 190 min | Room | 59 |
| IIIm | 1 | 5 | 11 days | Room | 63 |

[1] Ml. 37% HCHO per 500 ml. 1% sol.
[2] pH of HCHO treatment.
[3] Sol allowed to stand in presence of HCHO at the indicated temperature.

Example IV

Using the sol and procedure of Example III, the effects of time and pH (at room temperature) were as follows:

| Run | Conditions of Treatment | | | Wet Burst, 2.5% level, lbs./100 lbs. ream weight |
|---|---|---|---|---|
| | Level, ml.[1] | pH[2] | Time[3] | |
| IVa | | 7 | | 26 |
| IVb | | 5 | | 24 |
| IVc | | 3.5 | | |
| IVd | 1 | 7 | 5 min | 52 |
| IVe | 1 | 7 | 15 min | 56 |
| IVf | 1 | 7 | 30 min | 58 |
| IVg | 1 | 7 | 60 min | 58 |
| IVh | 1 | 7 | 120 min | 59 |
| IVi | 1 | 5 | 1 min | 26 |
| IVj | 1 | 5 | 15 min | 28 |
| IVk | 1 | 5 | 30 min | 30 |
| IVl | 1 | 5 | 60 min | 35 |
| IVm | 1 | 5 | 120 min | 56 |
| IVn | 1 | 5 | 40 days | 54 |
| IVo | 1 | 3.5 | 2 hours | 28 |
| IVp | 1 | 3.5 | 3.5 hours | 29 |
| IVq | 1 | 3.5 | 24 hours | 35 |
| IVr | 1 | 3.5 | 48 hours | 47 |

[1] Ml. 37% HCHO per 500 ml. 1% sol.
[2] pH of HCHO treatment.
[3] Sol allowed to stand in presence of HCHO at the indicated temperature.

Example V

A bisulfite adduct (excess bisulfite) of a periodate oxidized locust bean gum in which approximately 10% of the hexose units have been converted to dialdehyde units was used to prepare a 1% sol. 500 ml. of this sol was treated with 1 ml. 37% HCHO, at pH 5.5, and exhibited a wet burst (lbs./100 lbs. ream weight) of 76. A control wet burst (no HCHO) using the same bisulfite adduct was 36.

Example VI

The bisulfite adduct of Example I was prepared as sols of various concentrations and treated with 37% HCHO and allowed to stand for 30 minutes. Results were as follows:

| Run | Conc., percent | HCHO added (37%), ml./500 ml. sol | Appearance of sol |
|---|---|---|---|
| VIa | 0.5 | 0.5 | Fluid. |
| VIb | 1.0 | 1.0 | Do. |
| VIc | 1.5 | 1.5 | Some gelling. |
| VId | 2.0 | 2.0 | Do. |
| VIe | 2.5 | 2.5 | Do. |
| VIf | 3.0 | 3.0 | Strong gel. |

Example VII 5 grams of the dialdehyde guar bisulfite adduct of Example I was dissolved in 200 ml. distilled water. To this was added 2 ml. 37% formaldehyde solution. The sol was allowed to stand overnight. To this aged sol was then added 300 grams ammonium nitrate. The ammonium nitrate readily dissolved therein and the resulting sol was a viscous gel suitable for use in a slurry explosive composition.

The embodiments of the invention in which an exclusive property or privilege is claimed are defined as follows:

1. A process of activating bisulfide adducts of dialdehyde polysaccharides comprising treating said bisulfite adduct of a dialdehyde polysaccharide with a water soluble organic aldehyde.

2. A process as defined in claim 1 in which said dialdehyde polysaccharide is selected from the group consisting of dialdehyde starch, dialdehyde cellulose, and dialdehyde polygalactomannan gums.

3. A process of activating bisulfite adducts of dialdehyde polysaccharide comprising treating an aqueous solution of a bisulfite adduct of a dialdehyde polysaccharide with a water soluble organic aldehyde.

4. A process as defined in claim 3 in which said organic aldehyde is formaldehyde.

5. The composition consisting of the reaction product of a bisulfite adduct of a dialdehyde polysaccharide and a water soluble organic aldehyde.

6. The composition of claim 5 in which said dialdehyde polysaccharide is selected from the group consisting of dialdehyde starch, dialdehyde cellulose, and dialdehyde polygalactomannan gums.

7. The composition consisting of the reaction product of an aqueous solution of a bisulfite adduct of a dialdehyde polysaccharide with a water soluble organic aldehyde.

References Cited by the Examiner

UNITED STATES PATENTS

| | | | |
|---|---|---|---|
| 2,698,936 | 1/1955 | Staerkel et al. | 260—233.3 |
| 2,879,268 | 3/1959 | Jullander | 260—209 |
| 2,929,811 | 3/1960 | Hofreiter et al. | 260—233.3 |
| 3,062,703 | 11/1962 | Hofreiter et al. | 162—175 |
| 3,067,088 | 12/1962 | Hofreiter et al. | 162—175 |
| 3,098,869 | 7/1963 | Borchert | 260—209 |

LEWIS GOTTS, *Primary Examiner.*

MORRIS O. WOLK, *Examiner.*